May 28, 1957 D. A. DI TIRRO 2,793,619
SINGLE-STROKE PRESSURE OPERATED CUT-OFF VALVE AND
SYSTEM FOR OPERATION THEREWITH
Filed Dec. 9, 1953 2 Sheets-Sheet 1

INVENTOR.
Domenic A. Di Tirro.
BY
Harness, Dickey & Pierce
ATTORNEYS.

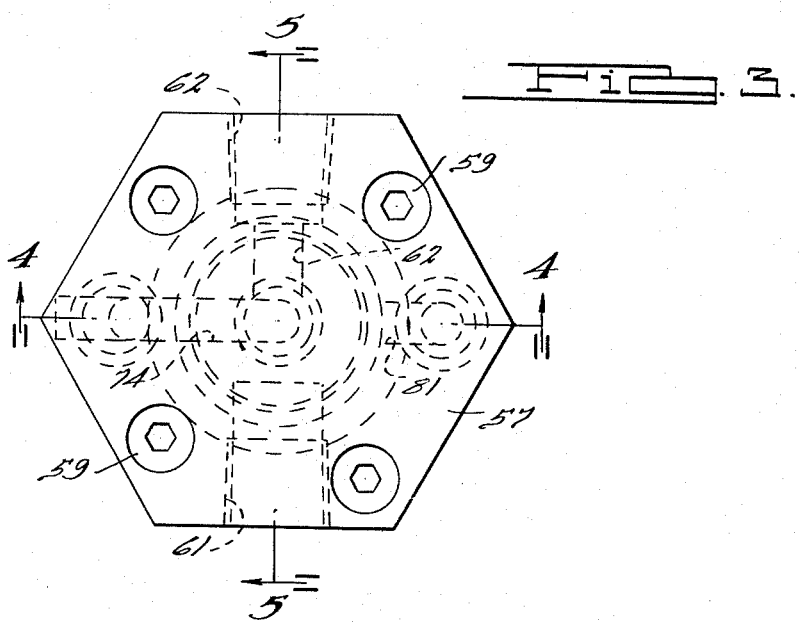
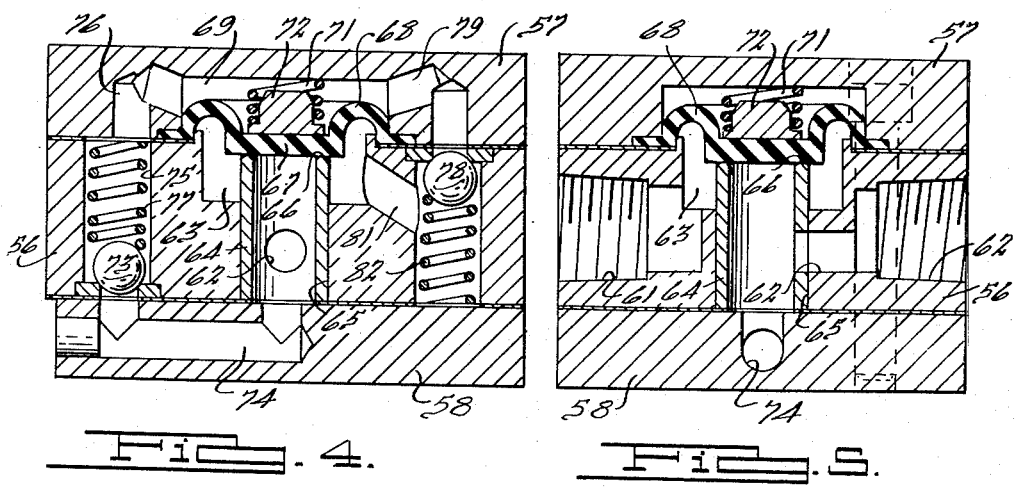

United States Patent Office 2,793,619
Patented May 28, 1957

2,793,619

SINGLE-STROKE PRESSURE OPERATED CUT-OFF VALVE AND SYSTEM FOR OPERATION THEREWITH

Domenic A. Di Tirro, Royal Oak, Mich., assignor to Ross Operating Valve Company, Detroit, Mich., a corporation of Michigan Application December 9, 1953, Serial No. 397,239

9 Claims. (Cl. 121—38)

This invention relates to valve constructions, and more particularly to safety valves for insuring the proper operation of fluid actuated devices.

In the operation of fluid actuated devices having repeating cycles it is often desirable that uncontrolled repetition of the cycle of operation be prevented, and that once a cycle is completed the next cycle may not start until certain other operations are performed. For example, in controlling fluid actuated clutches and brakes for power presses or similar machines, it is desirable that the proper cycling valve stop the press immediately upon completion of its stroke, and if the fluid supply is not properly shut off this cycling valve may at times be prevented from performing its proper function. If for example the control system is of the type having a hand operated valve which must be connected to exhaust before starting each cycle, the operator can sometimes defeat the purpose of the hand valve by holding down the valve in its supply position so that he can operate the machine at a faster rate. Similar problems also arise in systems having a sequence of operations, in which it is desired that a predetermined time elapse between repeated cycles and in which the uncontrolled supply of fluid to the system would alter the desired sequence timing.

Devices have been proposed for shutting off fluid flow temporarily at the end of a cycle, these devices operating by measurement of fluid volume or velocity. Such devices have inherent disadvantages, since they do not act in direct response to the condition of the fluid actuated device and are thus prone to develop timing errors. Furthermore, such devices must of necessity be used only with predetermined lengths of line and with fluid motors of predetermined capacity, since the devices are arranged to operate upon the attainment of a specified volume or velocity.

It is an object of the present invention to provide a single-stroke valve for a line connected to a fluid actuated device which works as a function of pressure and which will cut off further flow in the line when the line pressure reaches an equilibrium condition, so that the pressure must be again altered in a predetermined manner before the valve again opens to permit further flow in the line.

It is another object to provide an improved single-stroke valve of the above nature, which may be installed in the supply line of a fluid actuated device and which serves to permit supply flow of fluid until the pressure in the supply line reaches an equilibrium condition, and which thereafter prevents further fluid supply until the pressure in the supply line has been substantially reduced.

It is a further object to provide an improved single-stroke valve having the above characteristics, in which the supply flow and the exhaust flow in the line remain unobstructed, and in which the valve, once having been moved to closed position, remains in such position until fluid pressure is again supplied to the line after its being exhausted.

It is also an object to provide an improved single-stroke valve having the above characteristics and which is especially adapted for use in a system having a cycling valve for exhausting a portion of the system at a point in the operational cycle, the improved single-stroke valve preventing supply pressure from disturbing the operation of the cycling valve and thus permitting the use of a relatively inexpensive cycling valve while maintaining the accuracy of the operation.

It is a further object to provide an improved single-stroke valve of the above type which enables a manually operated control valve to be used in an emergency instead of the cycling valve, so that the effect of cycling valve actuation may be obtained before the cycling valve is actuated.

It is another object to provide an improved single-stroke valve of the above nature which does not depend on the measurement of volume or velocity of fluid for its action, and is therefore versatile in nature and useable in systems having varying capacities and velocity characteristics.

It is also an object to provide an improved single-stroke valve of the above nature which is of economical and compact construction and which has a relatively simple operation thus reducing fabricating and maintenance costs.

Other objects, features, and advantages of the present invention will become apparent from the subsequent description, taken in conjunction with the accompanying drawings.

In the drawings:

Figure 3 is a plan view of another embodiment of the single-stroke valve showing the configuration of the housing;

Figure 4 is an elevational view taken in cross-section along the line 4—4 of Figure 3 and showing the diaphragm valve as well as the positions of the pressure relief valve and check valve; and Figure 5 is an elevational view taken in cross-section along the line 5—5 of Figure 3 and showing the connections between the inlet and outlet ports and the valve chambers.

Figure 1:
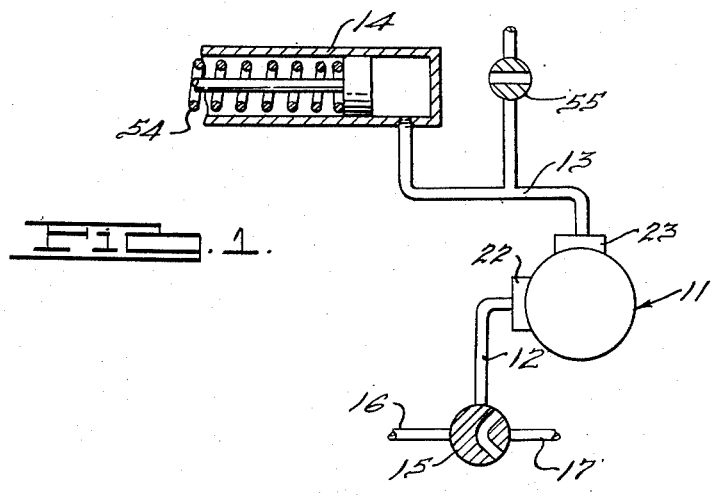
Figure 1 is a schematic view of a control system for fluid actuated devices showing the single-stroke valve of this invention installed in the supply line thereof.

The improved single-stroke valve 11 of this invention is shown schematically in Figure 1 as being in series with fluid conduits 12, 13 leading to a fluid actuated device 14. In the illustrated embodiment device 14 is shown as a single acting cylinder urged into retracted position by a spring 54. It will be understood that the improved single-stroke valve could be installed in various types of systems within the scope of the invention, and that for example device 14 could be an actuator for a master valve in a fluid pressure system. Lines 12 and 13 are shown as controlled by a three-way control valve 15 which is adapted to be manually actuated. The manual control valve has a supply connection 16 and an exhaust connection 17 and operates to supply or exhaust fluid to line 12. A cycling valve 55 is also shown in the system, this valve being of a two-way type and being connected to line 13 between valve 11 and device 14. Cycling valve 55 could for example be cam-controlled by the position of a machine such as a press (not shown), device 14 controlling the actuation of a clutch and/or brake (not shown) on the press. In certain installations means are provided for opening valve 55 to exhaust, for example when the press reaches the top of its stroke, thus exhausting the pressure in device 14 and disconnecting the press power drive. It should be understood that cycling valve 55 is shown in order to illustrate the advantages of the improved single-stroke valve, but that the principles of the invention do not depend on the presence of cycling valve 55.

The improved single-stroke valve functions so as to cut off the fluid supply from valve 15 to device 14 after the supply pressure in lines 12, 13 has reached an equilibrium condition, and to remain in cut-off position until lines 12, 13 have been exhausted and line 12 is again supplied with pressure fluid. As indicated above, the exhausting of line 13 by cycling valve 55 would therefore not affect the cut-off position of valve 11, and it is only after manual control valve 15 is connected to exhaust that the cut-off position of valve 11 is altered. In a system not containing a cycling valve 55, the operation of single-stroke valve 11 with respect to valve 15 will remain the same, the single-stroke valve remaining in cut-off position until valve 15 has been set to its exhaust and then to its supply position.

Figure 2:
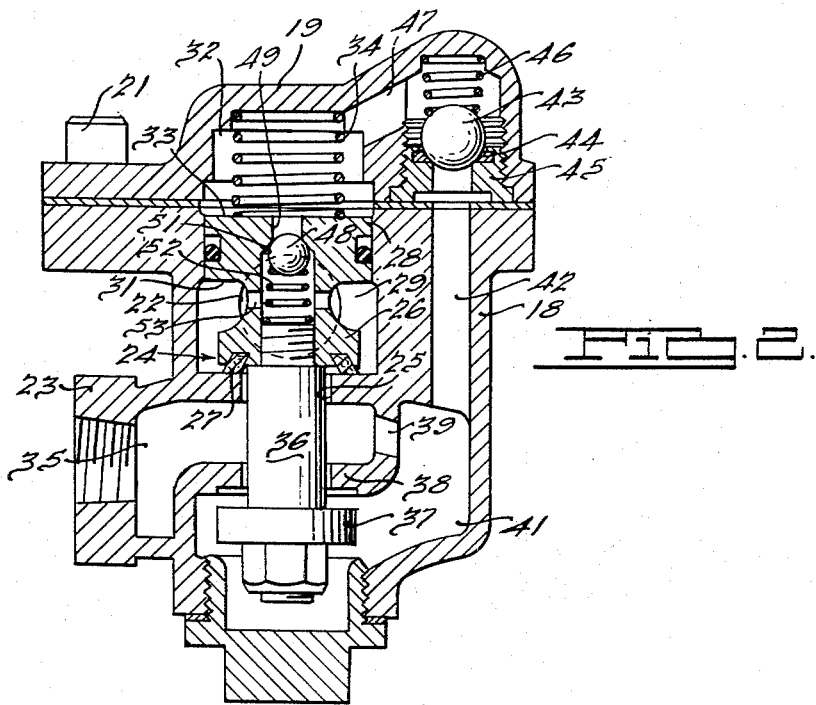
Figure 2 is a cross-sectional view of one embodiment of the single-stroke valve showing the essential elements thereof.

Referring to Figure 2, which shows one embodiment of the invention, the valve comprises a housing 18 having a cover portion 19 secured thereto by bolts 21. Housing 18 is provided with a port 22 for connection with line 12 and a port 23 for connection with line 13. Since line 12 connects valve 11 to control valve 15, port 22 may be termed a "control port," whereas port 23 may be termed a "working port," since it leads to device 14 through conduit 13. Ports 22 and 23 are connected by a poppet valve generally indicated at 24 which comprises a valve port 25 and a valve member 26 slidably mounted in housing 18. Valve member 26, which carries a sealing member 27 for engagement with valve seat 25, carries a piston 28 so that the valve is movable between open and closed positions by pressure differentials across the piston. In particular, control port 22 leads into a control chamber 29 in the housing which is closed at its upper end by the underside 31 of piston 28, while cover 19 has a safety chamber 32 formed therein which is closed at its lower end by the upper surface 33 of the piston. A helical compression spring 34 is disposed within chamber 32 and extends between cover 19 and upper end 33 of the piston. It will therefore be seen that when the fluid pressure in chamber 29 is such as to overcome the force of spring 34 plus the pressure in chamber 32, valve member 26 will be lifted, opening valve port 25, while equal or nearly equal pressures in chambers 29 and 32 will permit spring 34 to close valve port 25 by downward movement of valve member 26.

Means are provided for equalizing the pressures in chambers 29 and 32 an amount sufficient to close valve 24 after the pressures in conduits 12 and 13 have reached substantial equilibrium condition. For this purpose the single-stroke valve is provided with a chamber 35 below valve port 25 which leads to working port 23, valve member 26 having an extension 36 secured thereto and extending through chamber 35. The lower end of extension 36 carries a stop member 37 engageable with a wall 38 in the housing for limiting the upper position of valve member 26. It should be understood that the presence of extension 36, stop member 37 and wall 38 are not essential to the operation of the device, since other means could be provided for limiting the movement of valve member 26. Leading from chamber 35 is a passage 39 connecting with a chamber 41 which in turn is connected with a passage 42 leading to cover member 19. Enclosed within the cover member is a pressure relief valve 43 having a seat 44 held by a bushing 45, a spring 46 being provided to urge the valve into its closed position. The valve is so arranged as to permit fluid flow from passage 42 to a passage 47 in the cover which leads to chamber 32, only after a substantial pressure differential has been built up, thus creating a time lag between the start of pressure build-up in chamber 35 and the start of pressure build-up in chamber 32.

It should be noted that valve 43 also serves to prevent fluid flow from chamber 32 to port 23 through passage 42, chamber 41 and chamber 35. This function of valve 43 is important in understanding the operation of the single-stroke valve when a cycling valve such as valve 55, which may be in the system, is opened. In other words, valve 43 also acts as a check valve to prevent exhausting of chamber 32 when line 13 is exhausted, thus preventing premature operation of the single-stroke valve.

Means are provided for exhausting safety chamber 32 when chamber 29 is connected to exhaust, and this means preferably comprises a check valve 48 within valve member 26, member 26 having an axial passage 49 therein with a valve seat 51 against which valve 48 is urged by a helical spring 52. The other side of check valve 48 leads to a plurality of radial passages 53 in member 26, these radial passages connecting axial passage 49 with chamber 29. It will therefore be seen that when the fluid pressure in chamber 35 becomes substantially greater than that in chamber 32, fluid will flow from chamber 35 to chamber 32 past pressure relief valve 43, increasing the pressure in chamber 32. Should chamber 29 be placed at a lower pressure than chamber 32 however, fluid will leave chamber 32 through check valve 48, thus reducing the pressure in chamber 32 until it is again pressurized by the building up of pressure in chamber 35.

In operation, assuming an initial condition in which manual valve 15 is in its exhaust position, valve 55 is closed and valve member 26 is in its closed position shown in Figure 2, safety chamber 32 will also be exhausted since any fluid pressure therein would have left through passage 49, check valve 48, passages 53, chamber 29 and control port 22. Movement of valve 15 to its supply position will cause fluid to flow through control port 22 to control chamber 29. Valve member 26 will therefore be moved upwardly due to the pressure differential between chambers 29 and 32. Fluid will therefore be permitted to flow through valve port 25 into working chamber 35 and out through working port 23 to device 14. At the same time, fluid will flow from chamber 35 through passage 39, chamber 41 and passage 42, but pressure relief valve 43 will remain closed until the pressure in chamber 35 is substantially built up. Valve 43 thus serves to create a time lag in the pressure build-up of chamber 32, preventing premature tripping of the safety valve.

After device 14 has been fully supplied with fluid, chambers 29 and 32 will reach a condition of substantial pressure equilibrium, and spring 34 will therefore urge valve member 26 downwardly into closed position, so that fluid may not be further supplied to working chamber 35.

Should the control system have a cycling valve 55 which is opened to exhaust at a certain point in the cycle, the exhaustion of line 13 and the subsequent movement of device 14 will not affect the position of single-stroke valve 11. This is because valve 43 will prevent fluid in pressurized chamber 32 from flowing through port 23, and valve 24 will thus remain in closed position. It should be noted as this point that even if manual control valve 15 is still in its supply position, the pressure supplied to port 22 will not flow through to port 23 and therefore will not interfere with the operation of cycling valve 55.

Assuming the operator next moves valve 15 into its exhaust position, the pressure in control chamber 29 will be reduced, and the pressure trapped in safety chamber 32 by valve 43 will pass through check valve 48 into chamber 29. Valve member 26 will still remain in its lower or closed position as shown in Figure 2, since the pressure in exhausted chamber 29 is not sufficient to overcome the force of spring 34. Only when valve 15 is again moved to its supply position will the pressure in chamber 29 be sufficiently raised to open valve 24 in the manner previously described, and the cycle will be repeated.

It should be observed that in the absence of cycling valve 55 manual control valve 15 may be used to connect device 14 to exhaust, this connection being through working chamber 35, passage 39, chamber 41, passage 42, valve 43, passage 47, safety chamber 32, check valve 48, and chamber 29. In this case the check valves would preferably be of such dimensions and orifice diameters as to permit exhausting of device 14 at a rate sufficient to meet its operational requirements. It should also be noted in a system which includes cycling valve 55 the improved single-stroke valve 11 permits manual control valve 15 to be used as an emergency valve to connect device 14 to exhaust before cycling valve 55 has been actuated to its exhaust position.

Figures 3, 4 and 5 illustrate another embodiment of single-stroke valve 11 which is structurally different than the embodiment of Figure 2 but which functions essentially in the same manner. As shown in Figures 3, 4 and 5 the valve comprises a housing 56 having end caps 57 and 58 held by bolts 59. Housing 56 is provided with a control port 61 and a working port 62, these ports having the same position in the system as ports 22 and 23 respectively of the embodiment of Figure 2. Control port 61 is connected with a control chamber 63 which is formed in housing 56. A tubular member 64 is disposed within an aperture 65 in housing 56, and working port 62 is connected with this tubular member as seen in Figure 5. One end 66 of tubular member 64 projects into chamber 63 and forms a valve seat for a diaphragm valve 67, the diaphragm 68 of valve 67 being secured between end cap 57 and housing 56. A safety chamber 69 is formed in end cap 57 and is separated from control chamber 63 by diaphragm 68. Disposed within safety chamber 69 is a helical compression spring 71 carrying a member 72 which engages valve 67 and urges it against valve seat 66.

A pressure relief valve 73 is disposed between chambers 63 and 69 and performs a function similar to valve 43 in the previous embodiment. In particular, valve 73 is connected on one side to tubular member 64 by means of a passage 74 in end cap 58, and is connected on the other side to chamber 69 by a passage 75 in housing 56 and a connecting passage 76 in end cap 57. A spring 77 urges valve 73 into closed position, and the valve is so arranged as to permit fluid flow from passage 74 to passage 75 only after a substantial pressure differential has been built up. A check valve 78 is provided for exhausting safety chamber 69 when chamber 63 is connected to exhaust. This valve is connected to chamber 69 by a passage 79 in end cap 57, and the other side of the valve is connected to chamber 63 by a passage 81. A spring 82 urges valve 78 into closed position during which fluid is prevented from flowing from chamber 63 to chamber 69.

In operation, the embodiment shown in Figures 3, 4 and 5 will function the same way as the embodiment of Figure 2 insofar as its effect on the other portions of the system is concerned. Assuming an initial condition in which control port 61 is connected to exhaust and valve 67 is closed, safety chamber 69 will also be exhausted. When port 61 is connected to supply, fluid will flow into control chamber 63 lifting valve 67 against spring 71, and fluid will then flow through tubular member 64 and out through working port 62. When the pressure within tubular member 64 has been sufficiently increased valve 73 will open to build up the pressure in chamber 69. Valve 67 will thus be closed due to the action of spring 71, preventing further supply of fluid to the working port.

Should working port 62 be connected to exhaust, for example by a cycling valve 55 in the control system, the position of valve 67 will not be affected since there is no reduction in pressure in safety chamber 69. When control port 61 is again connected to exhaust, pressure in control chamber 63 will be reduced and the pressure trapped in safety chamber 69 will pass through check valve 78 and into chamber 63. Valve 67 will still remain in its closed position due to the force of spring 71, but will be lifted when control port 61 is again connected to supply.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a device of the class described, a housing having a control port for connection to a control valve and a working port for connection to a fluid actuated device, a valve in said housing between said ports, actuating means for said valve operable by fluid pressure differentials, a fluid connection between said control port and said actuating means, a second fluid connection between said working port and said actuating means, a check valve in said second fluid connection permitting flow only from said working port to said actuating means and preventing fluid flow from said actuating means to said working port, means responsive to a substantial pressure equilibrium condition between said control and working ports for causing said actuating means to close said second-mentioned valve, and means for permitting fluid flow from said working port to said control port when said second-mentioned valve is closed.

2. In a device of the class described, a housing having a control port for connection to a control valve and a working port for connection to a fluid actuated device, a valve in said housing between said ports, actuating means for said valve operable by fluid pressure differentials, said actuating means including a reciprocable member operatively connected to said valve, a control chamber on one side of said reciprocable member and connected to said control port, a safety chamber on the opposite side of said reciprocable member, fluid conducting means within said housing between said working port and said safety chamber for substantially equalizing said control chamber and safety chamber pressures when the pressures at said control port and working port attain substantial equilibrium, a check valve in said fluid conducting means permitting flow only from said working port to said safety chamber and preventing flow from said safety chamber to said working port, and a spring responsive to equalization of pressure in said control and safety chambers to close said second-mentioned valve.

3. The combination according to claim 2, further provided with a fluid conduit between said safety chamber and said control chamber, and a one-way valve in said fluid conduit permitting fluid passage from said safety chamber to said control chamber.

4. The combination according to claim 2, said check valve permitting fluid flow from said working port to said safety chamber only after a substantial pressure differential has been created between said port and said chamber.

5. In a device of the class described, a housing having a control port for connection to a control valve and a working port for connection to a fluid actuated device, a valve disposed between said ports, resilient means normally urging said valve into its closed position, a reciprocable actuating member connected to said valve, a control chamber on one side of said actuating member and connected to said control port, fluid pressure in said control chamber causing said actuating means to open said valve whereby fluid is supplied to said working port, a safety chamber on the opposite side of said actuating member, said resilient means being of such strength as to move and hold said valve in closed position when said control chamber pressure is less than or equal to said safety chamber pressure, a fluid connection between said working port and said safety chamber, a check valve in said fluid connection permitting flow only from said working port to said safety chamber and preventing flow from said safety chamber to said working port, a second fluid connection between said safety chamber and said control chamber, and a check valve in said second fluid connection permitting flow only from said safety chamber to said control chamber.

6. In a device of the class described, a housing having a control port for connection to a control valve and a working port for connection to a fluid actuated device, a control chamber and a working chamber connected to said control and working ports respectively, a poppet type valve between said ports, piston actuating means connected to said valve, resilient means urging said valve into its closed position, said control chamber when pressurized urging said valve into its open position against the action of said resilient means, a safety chamber on the side of said piston opposite said control chamber, said resilient means being disposed within said safety chamber and being of such strength as to move and hold said valve in closed position when said control chamber pressure is less than or equal to said safety chamber pressure, a fluid conduit between said working chamber and said safety chamber, pressure relief valve means in said fluid conduit permitting fluid flow from said working chamber to said safety chamber when a substantial pressure differential is attained, a second fluid conduit within said piston between said safety chamber and said control chamber, and one-way valve means in said last-mentioned fluid conduit permitting fluid flow only from said safety chamber to said control chamber.

7. In a fluid system of the type having a fluid actuated device, control valve means for supplying and exhausting fluid in said device, and a working line connecting said device and said valve means, safety means for said system including a valve interposed in said working line, a pressure operated actuating member for said valve, a fluid connection between said control valve means and one side of said actuating member, pressure in said connection tending to open said valve, a second fluid connection having one end connected to that portion of the working line between said safety means valve and said fluid actuated device and its other end connected to the other side of said actuating member, pressure in said second connection tending to close said valve, additional means tending to close said valve, whereby said valve will be opened upon initial application of pressure to said working line and will be closed when the pressures on both sides of said actuating member are substantially equalized, a check valve in said second fluid connection permitting flow only from said fluid actuated device to said other side of the actuating member and preventing flow from said other side of the actuating member to said fluid actuated device, a third fluid connection between the two sides of said actuating member, and a check valve in said third fluid connection permitting fluid flow only from said other side of the actuating member to said one side of the actuating member.

8. A fluid pressure control system including a fluid actuated device, manual control valve means for supplying and exhausting fluid in said device, a working line connecting said device and said valve means, a cycling valve connected to said working line and movable between a closed position and an exhaust position, a valve interposed in said working line between said manual control valve means and said cycling valve, a reciprocable pressure operated actuating member for said valve, a fluid connection between said manual control valve means and one side of said actuating member, pressure in said connection tending to open said valve, a second fluid connection having one end connected to said working line between said fluid actuated device and said second-mentioned valve, the other end of said second fluid connection being connected to the other side of said actuating member, one-way valve means in said second connection permitting fluid flow only in a direction from said fluid actuated device and preventing escape of fluid from said other side of the actuating member, pressure in said second connection tending to close said valve, a third fluid connection between the two sides of said actuating member, and one-way valve means in said third connection permitting fluid flow only from said second fluid connection to said first fluid connection.

9. In a device of the class described, a housing having a control port for connection to a control valve and a working port for connection to a fluid actuated device, a control chamber in said housing connected to said control port, a passageway leading from said control chamber to said working port, a valve seat formed at one end of said passageway, a diaphragm serving to enclose one side of said control chamber, a valve carried by said diaphragm and engageable with said valve seat, resilient means urging said valve against said valve seat, a safety chamber formed in said housing on the other side of said diaphragm, fluid pressure in said safety chamber tending to urge said valve against said valve seat, a fluid connection between said working port and said safety chamber, one-way valve means in said fluid connection permitting fluid flow only from said working port to said safety chamber and preventing escape of fluid from said safety chamber to said working port, a second fluid connection between said safety chamber and said control chamber, and second one-way valve means in said second fluid connection permitting fluid flow only from said safety chamber to said control chamber.

References Cited in the file of this patent

UNITED STATES PATENTS

| | | |
|---|---|---|
| 1,448,531 | Gow | Mar. 13, 1923 |
| 1,797,297 | Ringle | Mar. 24, 1931 |
| 2,103,962 | Wineman | Dec. 28, 1937 |
| 2,423,482 | Chochol | July 8, 1947 |
| 2,675,677 | Aikman | Apr. 20, 1954 |

FOREIGN PATENTS

| | | |
|---|---|---|
| 982,567 | France | Jan. 31, 1951 |